(12) United States Patent
Shafiee (10) Patent No.: US 10,795,382 B2
(45) Date of Patent: Oct. 6, 2020

(54) METHOD AND APPARATUS FOR MODEL-BASED CONTROL OF A WATER DISTRIBUTION SYSTEM

(71) Applicant: Sensus USA, Inc., Raleigh, NC (US)

(72) Inventor: Michael Ehsan Shafiee, Raleigh, NC (US)

(73) Assignee: SENSUS USA, INC., Raleigh, NC (US)

( * ) Notice: Subject to any disclaimer, the term of this patent is extended or adjusted under 35 U.S.C. 154(b) by 870 days.

(21) Appl. No.: 15/226,597

(22) Filed: Aug. 2, 2016

(65) Prior Publication Data

US 2018/0039290 A1 Feb. 8, 2018

(51) Int. Cl.
*G06Q 50/06* (2012.01)
*G05D 7/06* (2006.01)
(Continued)

(52) U.S. Cl.
CPC ............ *G05D 7/0682* (2013.01); *E03B 1/02* (2013.01); *G05B 17/02* (2013.01); *G06F 30/20* (2020.01);
(Continued)

(58) Field of Classification Search
CPC . E03B 1/02; G05B 17/02; G05B 2219/35499; G05D 7/0682; G06F 17/5009; G06F 2217/34; G06Q 10/04; G06Q 50/06
See application file for complete search history.

(56) References Cited

U.S. PATENT DOCUMENTS 3,678,468 A * 7/1972 Jefferson ............... G07C 5/0883
  711/167
4,562,552 A * 12/1985 Miyaoka ................... E03B 7/02
  137/255
(Continued)

FOREIGN PATENT DOCUMENTS

WO 2012036633 A1 3/2012

OTHER PUBLICATIONS

Wu, Zheng Yi, and T. M. Walski. "Pressure dependent hydraulic modelling for water distribution systems under abnormal conditions." IWA World Water Congress. 2006. (Year: 2006).*
(Continued)

*Primary Examiner* — Michael D Masinick
(74) *Attorney, Agent, or Firm* — Murphy, Bilak & Homiller, PLLC (57) ABSTRACT

A computer apparatus runs a hydraulic model using real-time or near-real-time data from an Automated or Advanced Metering Infrastructure (AMI), to improve model accuracy, particularly by obtaining more accurate, higher-resolution water demand values for service nodes in the model. Improving the accuracy of water demand calculation for the service nodes in the model stems from an improved technique that more accurately determines which consumption points in the water distribution system should be associated with each service node and from the use of real-time or near-real-time consumption data. The computer apparatus uses the water demand values to improve the accuracy and resolution of its water flow and pressure estimates. In turn, the improved flow and pressure estimation provides for more accurate control, e.g., pumping or valve control, flushing control or scheduling, leak detection, step testing, etc.

22 Claims, 4 Drawing Sheets

(51) Int. Cl.
*E03B 1/02* (2006.01)
*G06Q 10/04* (2012.01)
*G06F 30/20* (2020.01)
*G05B 17/02* (2006.01)
*G06F 113/14* (2020.01)

(52) U.S. Cl.
CPC ............ *G06Q 10/04* (2013.01); *G06Q 50/06* (2013.01); *G05B 2219/35499* (2013.01); *G06F 2113/14* (2020.01)

(56) References Cited

U.S. PATENT DOCUMENTS

| | | | | |
|---|---|---|---|---|
| 5,133,622 | A * | 7/1992 | Hewlett | A01G 25/06 405/39 |
| 8,248,269 | B1 * | 8/2012 | Boyd | H04Q 9/00 340/870.02 |
| 8,958,922 | B2 * | 2/2015 | Blank | G05B 15/02 700/282 |
| 2003/0093236 | A1 * | 5/2003 | Wu | G06N 3/126 702/85 |
| 2005/0178708 | A1 * | 8/2005 | Mark | C02F 9/005 210/138 |
| 2005/0246102 | A1 * | 11/2005 | Patwardhan | A01G 25/16 702/2 |
| 2006/0071776 | A1 * | 4/2006 | White | H02J 13/0086 340/538 |
| 2009/0058088 | A1 * | 3/2009 | Pitchford | G01D 4/004 290/50 |
| 2009/0235992 | A1 * | 9/2009 | Armstrong | G01M 3/2807 137/487.5 |
| 2012/0185184 | A1 * | 7/2012 | Armon | G01D 4/002 702/51 |
| 2013/0211797 | A1 * | 8/2013 | Scolnicov | G06Q 10/0639 703/2 |
| 2014/0229142 | A1 * | 8/2014 | Schrum, Jr. | G06F 17/5004 703/1 |
| 2015/0167286 | A1 * | 6/2015 | Emborg | E02B 11/005 210/767 |
| 2016/0273934 | A1 * | 9/2016 | Seko | G01C 21/3635 |
| 2017/0132338 | A1 * | 5/2017 | Al Gahtani | G06F 30/20 |
| 2018/0039290 | A1 * | 2/2018 | Shafiee | G06Q 50/06 |
| 2018/0195926 | A1 * | 7/2018 | Barker | E03B 7/07 |
| 2018/0196399 | A1 * | 7/2018 | Rasekh | G06Q 10/06393 |

OTHER PUBLICATIONS

Paluszczyszyn, Daniel, Piotr Skworcow, and Bogumil Ulanicki. "Online simplification of water distribution network models for optimal scheduling." Journal of Hydroinformatics 15.3 (2013): 652-665. (Year: 2013).*

Baumberger, Laura et al., "Effect of GIS-Based Demand Allocation on Water Distribution System Modeling", Florida Water Resources Journal, Dec. 2007, 15-19.

Cheng, W. P. et al., "Real-Time Model of a Large-Scale Water Distribution System", 16th Conference on Water Distribution System Analysis, WDSA 2014, 2014, 457-466.

Shamsi, Uzair, "GIS Applications for Water Distribution Systems", Journal of Water Management Modeling R220-21 www.chijournal.org, 2004, 459-473.

Unknown, Author, "DemandAnalyst", 2016, Innovyze http://www.innovyze.com/prodcuts/demandanalyst/, 2016, 1.

Unknown, Author, "Meter data enables accurate, customer-specific water usage", Metering & Smart Energy International http://www.metering.com/meter-data-enables-accurate-customer-specific-water-usage/, Aug. 26, 2015, 1-4.

Walski, Thomas M. et al., "Advanced Water Distribution Modeling and Management: Integrating GIS and Hydraulic Modeling", Bentley Institute Press, 526-571.

Whittle, A. J. et al., "Sensor Networks for Monitoring and Control of Water Distribution Systems", The 6th International Conference on Structural Health Monitoring of Intelligent Infrastructure Hong Kong, 2013, 1-13.

* cited by examiner

METHOD AND APPARATUS FOR MODEL-BASED CONTROL OF A WATER DISTRIBUTION SYSTEM

TECHNICAL FIELD

The present invention relates to water distribution systems, and particularly relates to model-based control of a water distribution system.

BACKGROUND

Figure 1:
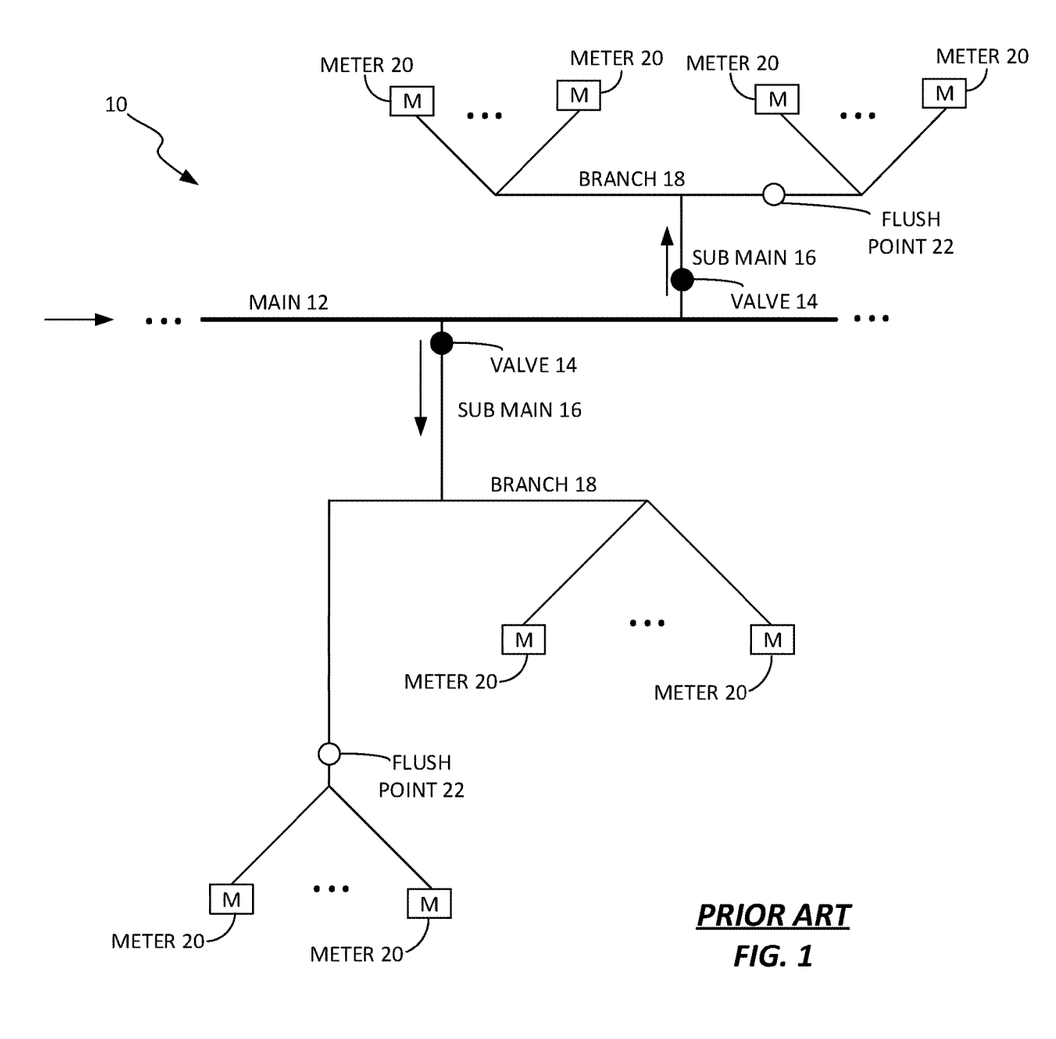
FIG. 1 is a simplified diagram of an example water distribution system.

Water distribution systems include tanks, pipes, and pumps for delivering water to households, commercial buildings, and industrial facilities. FIG. 1 depicts a representative water distribution system 10. The water distribution system 10 includes a water main 12 and valves 14 to control water flow in sub mains 16. Each sub main 16 may include one or more branches 18 that have waters meters 20 that meter water consumption and provide corresponding consumption data. Flush points 22 depicted in the water distribution system 10 may be used for testing and maintenance, such as for controlling water aging, treatment, etc.

Water utilities rely on hydraulic models to simulate the movement of water in a water distribution system. A hydraulic model represents the layout of nodes, pumps, tanks, pipes, valves, and water resources in the water distribution system. The hydraulic model simulates pressures and water flows in pipes using the geographical location of the pumps, tanks, pipes and resources such as lakes and wells, along with parametric data. Example parametric data includes pipe roughness, pump performance curves, etc.

The typical water distribution system has many distributed consumption points, such as the metered consumption points associated with the various industrial, commercial, and residential customers of the operator of the water distribution system. Hydraulic models include so-called "service nodes" to model the consumption points in the water distribution system. As an example, all or a subset of the metered consumption points along a branch 18 may be represented by a corresponding service node in the hydraulic model. The service node would have a modeled physical location at a pipe location in or leading into the involved branch 18.

The water demand or amount of water "consumed" at each service node may be estimated using available historical data. However, such data sets typically lack the resolution and accuracy to make accurate consumption estimates for particular times or days. Moreover, the mechanisms for associating actual consumption in the water distribution system with the modeled service nodes are simplistic and prone to inaccuracies, e.g., based on simple proximity. To the extent that actual consumption in the water distribution system is attributed to the wrong service node in the hydraulic model, the hydraulic model will necessarily produce inaccurate results for control, forecasting, or other uses, and model adaptations tainted by such inaccuracies may worsen, rather than improve the model accuracy.

SUMMARY

A computer apparatus runs a hydraulic model using real-time or near-real-time data from an Automated or Advanced Metering Infrastructure (AMI), to improve model accuracy, particularly by obtaining more accurate, higher-resolution water demand values for service nodes in the model. Improving the accuracy of water demand calculation for the service nodes in the model stems from an improved technique that more accurately determines which consumption points in the water distribution system should be associated with each service node and from the use of real-time or near-real-time consumption data. The computer apparatus uses the water demand values to improve the accuracy and resolution of its water flow and pressure estimates. In turn, the improved flow and pressure estimation provides for more accurate control, e.g., pumping or valve control, flushing control or scheduling, leak detection, step testing, etc.

According to some embodiments, a method performed by a computer apparatus includes obtaining a meter elevation, a meter location, and water consumption data, for individual water meters installed in a water distribution system. The method also includes automatically associating each water meter with a respective one of a plurality of service nodes representing points of water consumption in a hydraulic model of the water distribution system, by evaluating modeled location and elevation data for the service nodes in relation to the meter location and the meter elevation, to identify the geographically-closest service node having a modeled elevation that is greater than the meter elevation.

Further, the method includes calculating water demand values for each service node, based on an aggregation of the water consumption data for all of the water meters that have been automatically associated with the service node. The method also includes estimating water flows and pressures for at least a portion of the water distribution system, by running the hydraulic model with the calculated water demand values. The method then includes performing a control operation for the water distribution system, based on the estimated water flows and pressures. The control operation comprising at least one of leak detection, pumping or storage control, and treatment or flushing control.

In another example embodiment, a computer apparatus comprises input/output circuitry and processing circuitry operatively associated with the input/output circuitry. The input/output circuitry includes at least one of a network communication interface circuit configured for communication on a computer network, and a storage system interface circuit configured for reading data from and writing data to a storage system. Among other things, the processing circuitry is configured to associate water meters in the water distribution network with service nodes in a hydraulic model of the water distribution system.

In an example configuration, the processing circuitry is configured to obtain a meter elevation, a meter location, and water consumption data, for individual water meters installed in a water distribution system, and automatically associate each water meter with a respective one of a plurality of service nodes representing points of water consumption in a hydraulic model of the water distribution system. The processing circuitry carries out the association processing by evaluating modeled location and elevation data for the service nodes in relation to the meter location and the meter elevation, to identify the geographically-closest service node having a modeled elevation that is greater than the meter elevation.

The processing circuitry is further configured to calculate water demand values for each service node, based on an aggregation of the water consumption data for all of the water meters that have been automatically associated with the service node, and to estimate water flows and pressures for at least a portion of the water distribution system, by running the hydraulic model with the calculated water demand values. Still further, the processing circuitry is configured to perform a control operation for the water distribution system, based on the estimated water flows and pressures, said control operation comprising at least one of leak detection, pumping or storage control, and treatment or flushing control.

Of course, the present invention is not limited to the above features and advantages. Indeed, those skilled in the art will recognize additional features and advantages upon reading the following detailed description, and upon viewing the accompanying drawings.

DETAILED DESCRIPTION

The embodiments described herein provide for improved control and management of a water distribution system via the realization and use of a more accurate and higher resolution hydraulic model of the water distribution system. To increase the accuracy and resolution of a hydraulic model, meters are associated with service nodes by evaluating location and elevation data for the service nodes relative to the respective locations and elevations for the meters. This technique identifies the geographically-closest service node having a modeled elevation that is greater than the meter elevation. Real-time water demand is calculated and aggregated for every service node at each model simulation time using metered values incoming from an Automated Meter Reading (AMR) network.

The calculated real-time water demand for identified service nodes is then used to estimate water flows and pressures for the water distribution system by running the hydraulic model with the calculated water demands. Because service nodes in the hydraulic model are accurately identified and more frequently updated in terms of their associated water demand values, an accurate real-time demand-driven water distribution hydraulic model is provided. As a result, control operations are performed more effectively, based on more accurate estimations of water flows and pressures. Not only are such estimations more accurate, but they also provide a higher resolution or finer granularity than is traditionally available, based on obtaining relevant data sets at multiple times during the day and making corresponding estimations or model runs.

Figure 2:
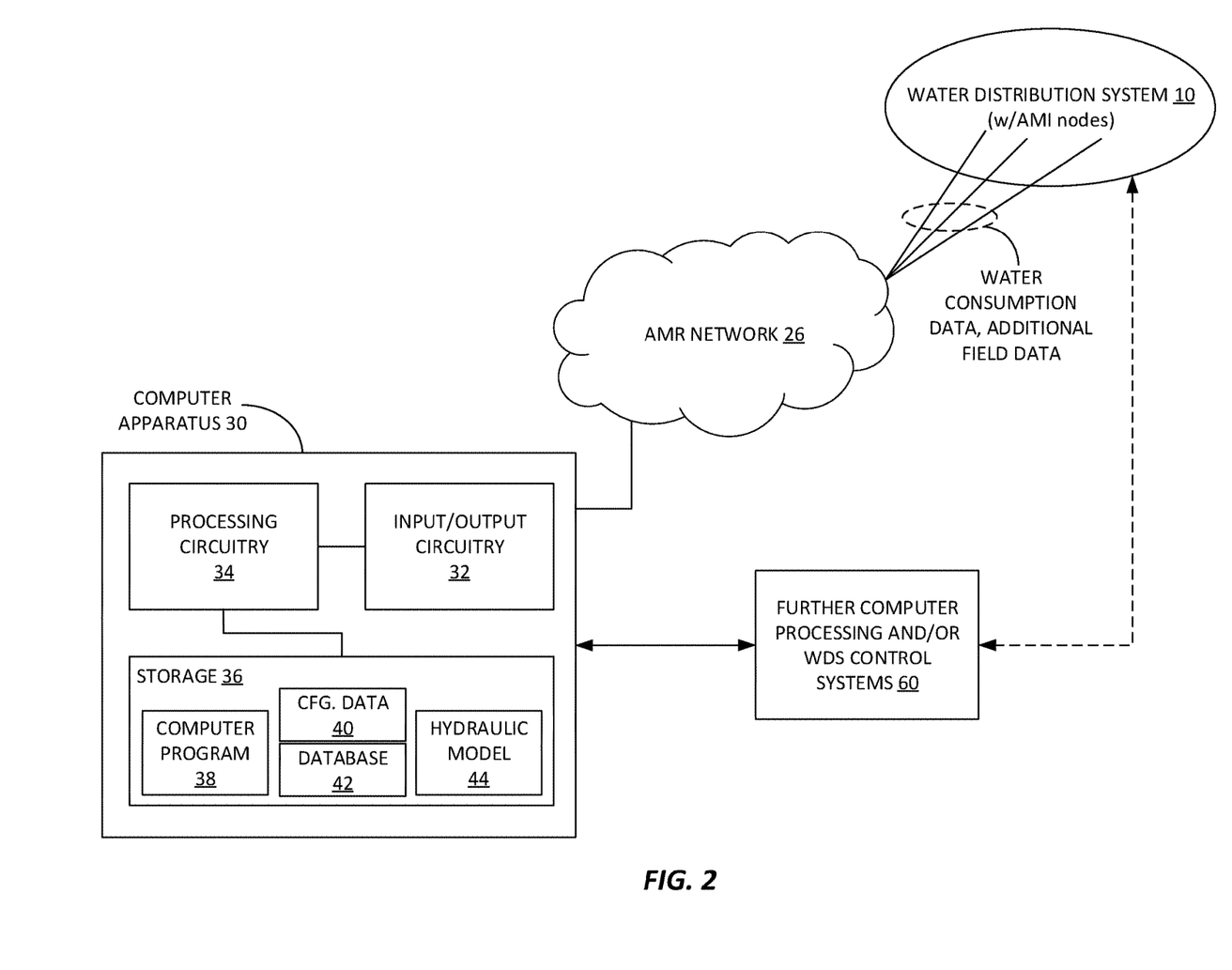
FIG. 2 is a block diagram of one embodiment of a computer apparatus configured to perform one or more control actions with respect to a water distribution system.

FIG. 2 is a diagram illustrating one embodiment of a computer apparatus 30 as contemplated herein. An Automatic Meter Reading (AMR) network 26 obtains water consumption data from the meters 20 (see FIG. 1) of a water distribution system 10, along with additional field data, such as measured water pressures and flows (flow rates). The AMR 26 may be part of an Advanced Metering Infrastructure (AMI). For example, the AMR network 26 includes radio frequency communication modules incorporated in or coupled to meters, pressure sensors, flow sensors, etc., for wireless reporting to base stations or other network nodes.

The computer apparatus 30 includes input/output circuitry 32 to obtain the water consumption data and additional field data from the AMR network 26. The input/output circuitry 32 may include communication interface circuits, such as an Ethernet or another computer network interface suitable for communicating with a node in the AMR network 26. Of course, the input/output circuitry 26 may, as an addition or as an alternative, include a cellular radio modem or other radio frequency communication interface that is configured to communicatively couple the computer apparatus 30 to the AMR 26. In general, the input/output circuitry 32 includes one or more physical-layer interface circuits for bi-directional communication between the computer apparatus 30 and one or more external device(s), nodes or systems, such as those that are part of the AMR 26.

The computer apparatus 30 also includes processing circuitry 34 that is operatively associated with the input/output circuitry 32. The processing circuitry 34 may include one or more microprocessor-based circuits, Digital Signal Processors (DSPs), Field Programmable Gate Arrays (FPGAs), Complex Programmable Logic Devices (CPLDs), Application Specific Integrated Circuits (ASICs), or any mix thereof. More broadly, the processing circuitry 34 comprises fixed circuitry, programmed circuitry, or a mix of fixed and programmed circuitry. Here, "fixed" circuitry denotes circuitry that is preconfigured to carry out particular operations or functions, while programmed circuitry takes on such configuration as a consequence of program instruction execution.

The computer apparatus 30 also includes storage 36, which in one or more embodiments provides volatile and non-volatile storage, e.g., working or data memory, along with program and data storage. While the storage 36 may comprise more than one type of storage—e.g., more than one type of memory or storage circuit—it shall be broadly understood as comprising a computer-readable medium, that includes storage for a hydraulic model 44 and any other relevant information that may be stored in a database 42.

Figure 3:
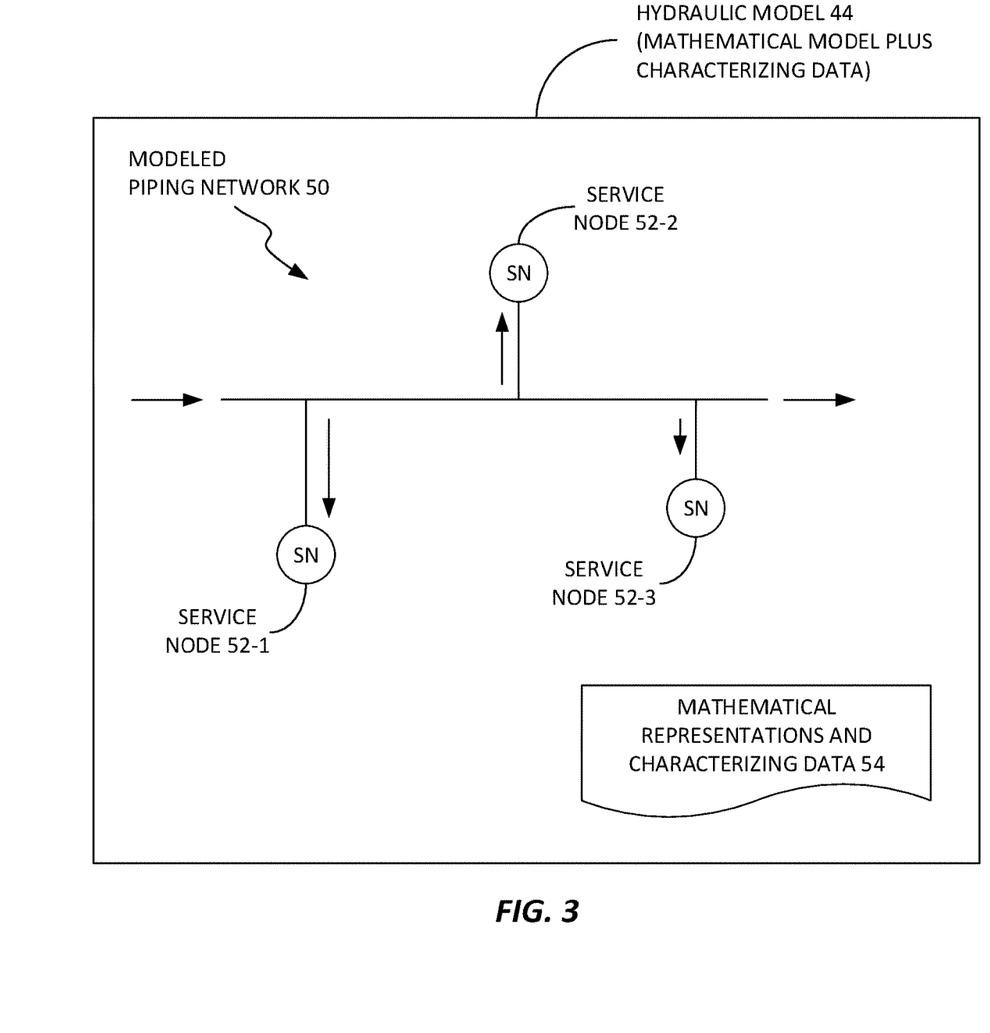
FIG. 3 is a diagram of one embodiment of a data structure or collection operative as a hydraulic model of a water distribution system, such as may be used by the computer apparatus of FIG. 2.

FIG. 3 is a diagram illustrating an example hydraulic model 44. As illustrated in FIG. 3, the hydraulic model 44 may include a modeled piping network 50 with multiple service nodes, e.g., service nodes 52, e.g., 52-1, 52-2, 52-3, and so on. The hydraulic model 44 further includes mathematical representations and characterizing data 58. Such characterizing data includes, e.g., pipe roughness coefficients for some or all of the piping represented in the hydraulic model, along with pump performance curves for pumps or pumps stations represented in the hydraulic model 44.

Hydraulic model data may be based on an EPANET (U.S. Environmental Protection Agency modeling software package) file that describes the water network (pipe locations, elevations, roughness, etc.). The model also may represent operating state or conditions for the water distribution system 10, based on the computer apparatus 30 receiving supervisory control and data acquisition (SCADA) information that provides control status information for the water distribution system 10 (such as which pumps are on, which ones are off, etc.). Hydraulic model inputs may also include real-time AMI/AMR data, including consumption, flow, and pressure data that is measured in real-time junctions, or near-real-time by meters or other sensors distributed in the water distribution system 10. The hydraulic model 44 will also be understood as using equations to represent or otherwise model the flow of water in the water distribution system 10, and to estimate corresponding water flows (rate, direction) and pressures.

The storage 36, in one or more embodiments, stores a computer program 38 comprising program instructions that, when executed by one or more processing circuits of the computer apparatus, specially adapts such processing circuits to operate as the aforementioned processing circuitry 34. For such operation, the storage 36 provides non-transitory storage for the computer program 38 and any related configuration data 40, where "non-transitory" does not necessarily mean permanent or unchanging but does connote storage of at least some persistence, e.g., the program instructions are held in memory for execution. As such, the storage 36 comprises, for example, SRAM, DRAM, or other working memory, along with FLASH, EEPROM, SSD, or another non-volatile storage circuitry.

With reference again to FIG. 2, the computer apparatus 30 may be any computing device, such as a stand-alone computer server or a server blade, and comprises input/output circuitry 32 comprising at least one of a network communication interface circuit configured for communication on a computer network, and a storage system interface circuit configured for reading data from and writing data to a storage system.

The computer apparatus 30 further includes processing circuitry 34 that is operatively associated with the input/output circuitry 32 and configured to obtain a meter elevation, a meter location, and water consumption data, for individual water meters 20 installed in a water distribution system 10. The processing circuitry 34 may also obtain, e.g., via the input/output circuitry 32, geographic information data or metadata that represents the physical connections and pipe layout of the water distribution system 10. The processing circuitry 34 is further configured to automatically associate each water meter 20 with a respective one of a plurality of service nodes 52 representing points of water consumption in a hydraulic model 44 of the water distribution system 10.

The automatic association is based on the processing circuitry 34 evaluating modeled location and elevation data for the service nodes 52 in relation to the meter location and the meter elevation, to identify the geographically-closest service node 52 having a modeled elevation that is greater than the meter elevation. Note that the modeled elevation may be an elevation known for a point or junction in the piping within the water distribution system 10 that corresponds to the service node 52.

The processing circuitry 34 is also configured to calculate water demand values for each service node 52, based on an aggregation of the water consumption data for all of the water meters 20 that have been automatically associated with the service node 52. The processing circuitry 34 is further configured to estimate water flows and pressures for at least a portion of the water distribution system 10, by running the hydraulic model 44 with the calculated water demand values. Here, "running" the hydraulic model 44 comprises solving a set or series of equations relating water consumption and corresponding flows and pressures. In at least one embodiment, running the hydraulic model 44 comprises solving a linear programming problem that expresses the model outputs—water flows and pressures—as a function of the model inputs—including the calculated water demand values, pipe sizes and diameters, pump characteristics, valve characteristics, tank sizes, and pipe connections. Running the hydraulic model 44 includes operation rules that are applied in the field. The operation rules are included in or obtained for the hydraulic model 44 using SCADA data.

As an example of the hydraulic principles and governing equations associated with the hydraulic model 44, consider that hydraulic head may be calculated for a given point in a pipe system using Bernoulli's Equation, expressed as $$H_a = \frac{p_a}{\gamma} + \frac{v_a^2}{2g} + h_a,$$

where $H_a$ is the value of hydraulic head at the point a, $p_a$ is the water pressure, $v_a$ is the water velocity, and $h_a$ is the elevation of the point a. The value $\gamma$ is the water specific weight. The pressure and flow at other points in the same pipe can be calculated based on headloss between the two points. Empirical equations such as Darcy-Weisbach and Hazen-Williams equations can be used to calculate headloss between point "a" and point "b" in the same pipe, $$\frac{p_a}{\gamma} + \frac{v_a^2}{2g} + h_a = h_{loss} + \frac{p_b}{\gamma} + \frac{v_b^2}{2g} + h_b.$$

The hydraulic model 44 is based on fundamental equations formulated to describe pipes, pumps, and other elements in the water distribution system 10. Such equations describe or account for the sizes and types of pipes, the sizes and types of tanks and pumps, and rely parameters for pipe roughness, etc. The hydraulic model 44 also relies on or incorporates the water demand values determined according to the teachings herein.

In one example, the hydraulic model 44 models the water distribution system 10 as a graph with n junction nodes and $n_f$ nodes with fixed grade, which includes tanks and reservoirs. If pipe $p_{ij}$ connects node i to node j, the headloss in the pipe $p_{ij}$ is as follows:

$$H_{i,t} - H_{j,t} = h_{ij,t} = rQ_{ij,t}^\alpha + mQ_{ij,t}^2,$$

where H=nodal head, h is headloss, r=pipe resistance, Q is flow rate, $\alpha$ is a flow exponent, m is a minor loss coefficient, and t is time of simulation. Darcy-Weisbach and Hazen-Williams equations are used to compute the pipe resistance values r.

For a loop in a water network, the above equation can be used to derive a set of equations based on the conservation of energy of a fluid. The conservation of energy states that the energy (kinetic and potential) of an isolated system is path independent. This means that the headloss along any path from the entrance to the exit of the loop are equal.

The head of pumps can be calculated by a power law of the form:

$$h_{ij,t} = -w^2(h_0 - r(Q_{ij,t}/w)^\beta),$$

where $h_0$ is the shutoff head for the pump, w is a relative speed setting, and r and $\beta$ are the pump-curve coefficients.

The below equation represents the second set of equations that are based on the conservation of mass. The law of conservation of mass states that mass can neither be created or destroyed and the following equation satisfies the flow continuity through all nodes.

$$\sum_j Q_{ij,t} - D_{i,t} = 0, i = 1, \ldots, n$$

where $D_i$ is the flow demand at the service node i. That is, the index i represents a defined service node in the water distribution system 10, and $D_i$ represents water demand value that is associated with the service node 52 at that location. Conventional hydraulic modeling approximated demands $D_i$ based on the land use and population density in area i, and such values were updated infrequently at best. As a consequence, any hydraulic model using such demand values necessarily operated with relatively low (temporal) resolution, and oftentimes operated with outdated demand values.

As taught herein, the water demand values associated with each service node 52 are computed based on the meter-to-node association algorithm taught herein, and the real-time or near-real-time meter data obtained from the AMR network 26 for the water distribution system 10. Thus, the water-demand computations contemplated herein represent substantial improvements in the accuracy and resolution of water-demand calculations used by the hydraulic model 44, and they provide a basis for solving for flows and pressures of the water distribution system 10 for at high accuracy and high resolution, e.g., at each time step $t_s$.

The computer apparatus 30 in one or more embodiments thus can be understood as using incoming AMR data for repeatedly solving the preceding equations. The flows and pressures calculated at each time step may then be used as initial boundary conditions for the next time step. In this context, at each time step $t_s$ of the simulation or model run, the processing circuitry 34 extracts consumption data from the incoming or most-recently obtained AMI data.

The contemplated algorithm maps the service nodes 52 in the hydraulic model 44 to water meters 20 in the water distribution system 10, based on their locations and elevations, and aggregates the consumption values to find the demand at every service node 52 for the given time step. The result of this step updates $D_{i,t}$ in the above flow-continuity equation, where $t=t_s$. The algorithm checks the list of all meters to include and exclude the consumption at any time a water meter 20 is added to or removed from the water distribution system 10.

For additional details related to hydraulic modeling, the interested reader may refer to Salgado, R., Todini, E., and O'Connell, P. (1988), "Extending the gradient method to include pressure regulating valves in pipe networks," Computer Applications in Water Supply; and to Todini, E. and Pilati, S. (1988), "Computer applications in water supply: vol. 1|systems analysis and simulation," Research Studies Press Ltd., Taunton, UK (with particular reference to pp. 1-20, Chapter A). Both such references are incorporated herein by reference, in their entirety.

Turning back to the overall operation of the processing circuitry 34, the processing circuitry 34 is further configured to perform a control operation for the water distribution system 10, based on the estimated water flows and pressures. The control operation comprises at least one of leak detection, pumping or storage control, and treatment or flushing control. In an example embodiment, the processing circuitry is configured to receive the water consumption data on a near real-time basis via an Automated Meter Reading (AMR) network 26 that communicatively couples to the water meters 20, and calculates the water demand values in each of a succession of recurring time intervals of one hour or less.

Further, in at least one embodiment, the water consumption data is timestamped and the processing circuitry 34 is configured to estimate the water pressures and flows at multiple times during the day, and record the estimated water pressures and flows in association with corresponding time-of-day information. The use of timestamping and the corresponding estimation and recordation of hourly or other short-interval estimations of flow and pressure for the water distribution system 10 provides the system operator with a high-resolution set of data for monitoring and controlling the water distribution system 10.

The direction of water flow in one or more pipes in the water distribution system 10 depends on prevailing conditions in the water distribution system 10. Correspondingly, in at least one embodiment, the processing circuitry 34 is configured to determine the direction of water flow in the one or more pipes on at least an hourly basis, and record the determined directions of water flow with corresponding time-of-day information. Again, such operations provide the system operator with high-resolution data corresponding to real-time or near-real-time measurements incoming from the AMR network 26.

The processing circuitry 34 in one or more embodiments is configured to receive field data having temporal correspondence to the recurring time intervals and comprising recorded flows and pressures. Correspondingly, the processing circuitry 34 is configured to revise one or more model parameters in the hydraulic model 44, based on the recorded flows and pressures and the estimated flows and pressures. The one or more model parameters include a pipe roughness parameter for one or more modeled pipes in the hydraulic model, and may further include pump performance "curves" for one or more pumps in the water distribution system 10. A pump curve reflects pump performance and represents the relationship between flow rate and head for the pump.

In an example embodiment related to controlling the water distribution system 10, the processing circuitry 34 is configured to perform flushing control, based at least in part on the estimated flow rates for all or a portion of the water distribution system 10. For example, the processing circuitry 34 is configured to perform flushing control by determining a flushing schedule for at least a portion of the water distribution system 10, in dependence on the estimated flow rates. The flushing schedule identifies times or frequencies for performing flushing at one or more known flush points within the water distribution system 10, and can be output as an electronic data record for driving automated valve controls in the water distribution system 10, for processing by a further computer system, or for use by service personnel associated with the water distribution system 10.

In the same embodiment, or in another example embodiment, the processing circuitry 34 is configured to obtain field data for the water distribution system 10 having a temporal correspondence with the water demand data. The field data indicates upstream water quantities flowing towards the water meters associated with one or more of the service nodes 52 in the hydraulic model 44, and the processing circuitry 34 is configured to perform leak detection as a control operation towards the water distribution system 10. Here, the leak detection is based on the processing circuitry 34 identifying discrepancies between the indicated upstream water quantities and the water demand values, for one or more of the service nodes 52, and outputting data identifying involved portions of the water distribution system. The data may comprise control data or associated signaling for valve control and/or may comprise data for processing by a further computer or for use by service personnel.

In yet another aspect of the computer apparatus 30, the processing circuitry 34 is configured, in one or more embodiments, to evaluate the modeled location and elevation data for the service nodes 52 in relation to the meter locations and meter elevations by, for a given water meter, determining a Euclidean distance between the water meter and each service node 52 in at least a neighbor set among the plurality of service nodes 52. The processing circuitry 34 ranks at least the neighbor set of service nodes 52 in ascending order of Euclidean distance from the meter location, and identifies the highest-ranked service node 52 whose modeled elevation is greater than the meter elevation.

In a more generalized case, the processing circuitry 34 uses the piping relationships, elevational data, and meter/service node locations, to identify the closest service node 52 having an elevation at least as high as the meter 20. In at least one embodiment, for a given meter 20, the processing circuitry 34 is configured to evaluate the modeled location and elevation data for the service nodes 52 in relation to the meter location and the meter elevation by calculating the meter elevation from a geodetic baseline elevation known for the meter location and an elevational offset known from installation data associated with the water meter 20. The processing circuitry 34 is configured to receive the installation data from the AMR network 26, for example, which is communicatively coupled to the water meter 20 (or to a modem or other communication transceiver that is, in turn, associated with the water meter 20).

Figure 4:
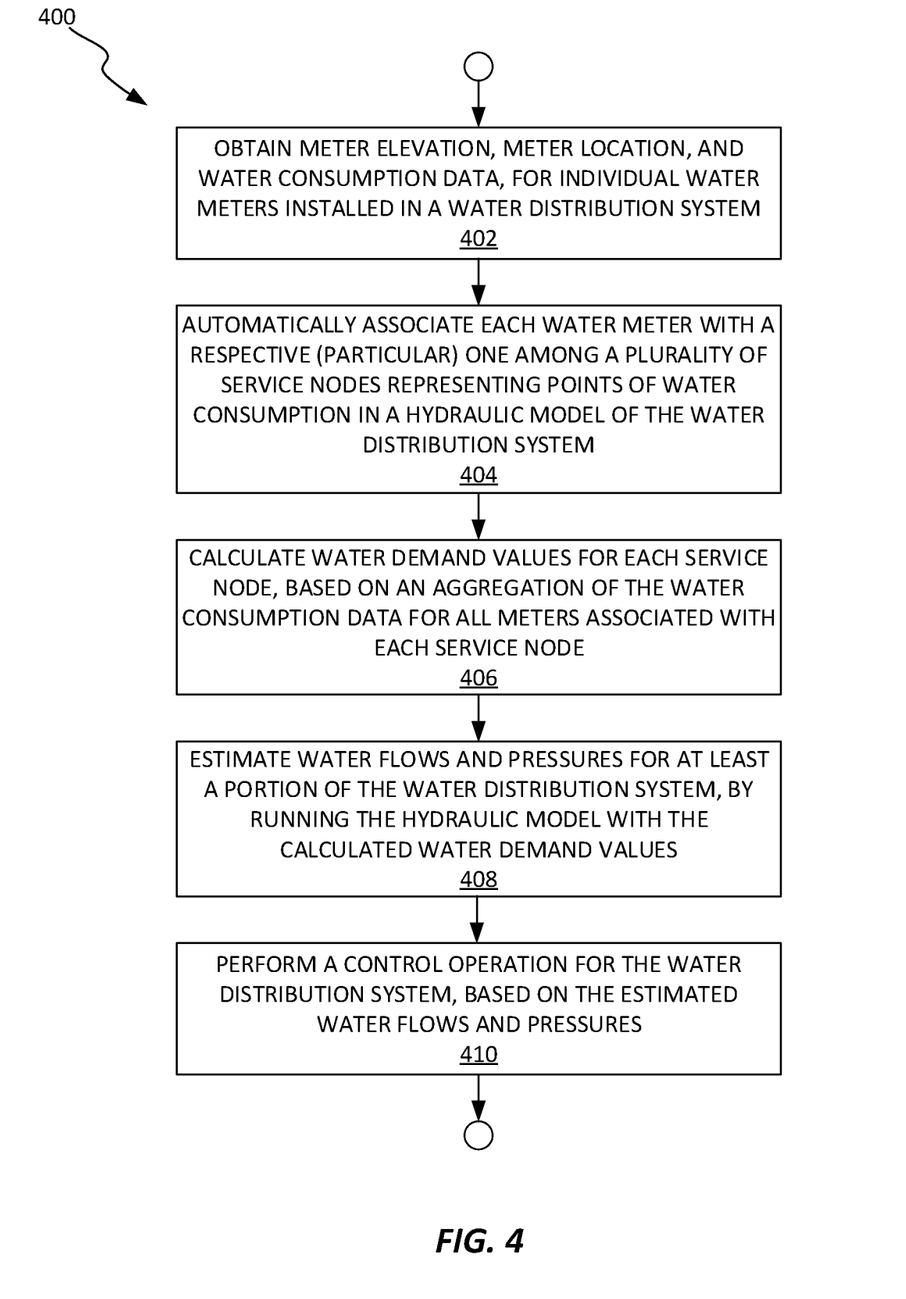
FIG. 4 is a logic flow diagram of one embodiment of a method of performing one or more control actions towards a water distribution system, such as may be implemented by the computer apparatus of FIG. 2, or by other processing arrangements.

FIG. 4 illustrates a method 400 performed by a computer apparatus, such as the computer apparatus 30. However, other computer arrangements may be used for carrying out the method 400. Further, one or more steps or operations in the illustrated method 400 may be performed in an order other than the example order suggested by the diagram. Still further, one or more steps may be performed concurrently and/or in conjunction with other processing, and it will be appreciated that all or part of the illustrated processing may be performed on a repeating or looped basis, e.g., responsive to periodically updated field data incoming from the AMR network 26, on a time, periodic basis, such as every ten minutes, every hour, etc.

The method 400 includes obtaining (Block 402) a meter elevation, a meter location, and water consumption data, for individual water meters 20 installed in a water distribution system 10, and automatically associating (Block 404) each water meter 20 with a respective one of a plurality of service nodes 52 representing points of water consumption in a hydraulic model 44 of the water distribution system 10. The association is performed by evaluating modeled location and elevation data for the service nodes 52 in relation to the meter location and the meter elevation, to identify the geographically-closest service node 52 having a modeled elevation that is greater than the meter elevation.

The method 400 further includes calculating (Block 406) water demand values for each service node 52, based on an aggregation of the water consumption data for all of the water meters 20 that have been automatically associated with the service node 52. Still further, the method 400 includes estimating (Block 408) water flows and pressures for at least a portion of the water distribution system 10, by running the hydraulic model with the calculated water demand values, and performing (Block 410) a control operation for the water distribution system 10. The control operation is performed based on the estimated water flows and pressures, and comprises at least one of leak detection, pumping or storage control, and treatment or flushing control.

In another aspect of operation, the computer apparatus 30 is configured to improve the hydraulic model 44—e.g., by revising one or more pipe roughness parameters—based on evaluating water flows estimated using the hydraulic model 44 in relation to corresponding measured values for water flow and pressure. In one example, the flow and pressures measured for a portion of the water distribution system 10 during a "step test" are compared to corresponding water flow and pressure estimates produced by the hydraulic model 44. Discrepancies between the measured and estimated values indicate model error, and the computer apparatus 30 may use a Minimum Mean Square Error (MMSE) or other fitting process, to adjust pipe roughness parameters and/or other model parameters in the hydraulic model 44, to minimize the error. Here, it will be appreciated that a step test may be conducted by opening one or more fire hydrants or other outflow points in the water distribution system 10 and collecting water pressure and flow measurements in relevant portions of the water distribution system 10.

Notably, modifications and other embodiments of the disclosed invention(s) will come to mind to one skilled in the art having the benefit of the teachings presented in the preceding descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a computer apparatus comprising:
   obtaining a meter elevation, a meter location, and water consumption data, for individual water meters installed in a water distribution system;
   automatically associating each water meter with a respective one of a plurality of service nodes representing points of water consumption in a hydraulic model of the water distribution system, by evaluating modeled location and elevation data for the service nodes in relation to the meter location and the meter elevation, to identify the geographically-closest service node having a modeled elevation that is greater than the meter elevation;
   calculating water demand values for each service node, based on an aggregation of the water consumption data for all of the water meters that have been automatically associated with the service node;
   estimating water flows and pressures for at least a portion of the water distribution system, by running the hydraulic model with the calculated water demand values; and
   performing a control operation for the water distribution system, based on the estimated water flows and pressures, said control operation comprising at least one of: leak detection, pumping or storage control, and treatment or flushing control.

2. The method of claim 1, wherein obtaining the water consumption data comprises receiving the water consumption data on a near real-time basis via an Automated Meter Reading (AMR) network that communicatively couples to the water meters, and wherein the method includes calculating the water demand values in each of a succession of recurring time intervals of one hour or less.

3. The method of claim 2, wherein the water consumption data is timestamped and wherein estimating the water pressures and flows comprises estimating the water pressures and flows at multiple times during the day, and recording the estimated water pressures and flows in association with corresponding time-of-day information.

4. The method of claim 2, wherein the direction of water flow in one or more pipes in the water distribution system depends on prevailing conditions in the water distribution system, and wherein the method includes determining the direction of water flow in the one or more pipes on at least an hourly basis, and recording the determined directions of water flow with corresponding time-of-day information.

5. The method of claim 2, further comprising receiving field data having temporal correspondence to the recurring time intervals and comprising recorded flows and pressures, and revising one or more model parameters based on the recorded flows and pressures and the estimated flows and pressures, the one or more model parameters including a pipe roughness parameter for one or more modeled pipes in the hydraulic model.

6. The method of claim 1, wherein the step of performing the control operation comprises performing flushing control, based at least in part on the estimated flow rates for all or a portion of the water distribution system.

7. The method of claim 6, wherein performing flushing control comprises determining a flushing schedule for at least a portion of the water distribution system, in dependence on the estimated flow rates, wherein the flushing schedule identifies times or frequencies for performing flushing at one or more known flush points within the water distribution system.

8. The method of claim 1, wherein the method further comprises obtaining field data for the water distribution system having a temporal correspondence with the water demand data, the field data indicating upstream water quantities flowing towards the water meters associated with one or more of the service nodes in the hydraulic model, and wherein said step of performing the control operation comprises performing leak detection based on identifying discrepancies between the indicated upstream water quantities and the water demand values, for one or more of the service nodes, and outputting data identifying involved portions of the water distribution system.

9. The method of claim 1, wherein evaluating the modeled location and elevation data for the service nodes in relation to the meter location and the meter elevation comprises determining a Euclidean distance between the water meter and each service node in at least a neighbor set among the plurality of service nodes, ranking at least the neighbor set of service nodes in ascending order of Euclidean distance from the meter location, and identifying the highest-ranked service node whose modeled elevation is greater than the meter elevation.

10. The method of claim 1, wherein evaluating the modeled location and elevation data for the service nodes in relation to the meter location and the meter elevation includes calculating the meter elevation from a geodetic baseline elevation known for the meter location and an elevational offset known from installation data associated with the water meter.

11. The method of claim 10, further comprising receiving the installation data from an Automated Meter Reading (AMR) network that is communicatively coupled to the water meter.

12. A computer apparatus comprising:
input/output circuitry comprising at least one of: a network communication interface circuit configured for communication on a computer network, and a storage system interface circuit configured for reading data from and writing data to a storage system; and
processing circuitry that is operatively associated with the input/output circuitry and configured to:
obtain a meter elevation, a meter location, and water consumption data, for individual water meters installed in a water distribution system;
automatically associate each water meter with a respective one of a plurality of service nodes representing points of water consumption in a hydraulic model of the water distribution system, by evaluating modeled location and elevation data for the service nodes in relation to the meter location and the meter elevation, to identify the geographically-closest service node having a modeled elevation that is greater than the meter elevation;
calculate water demand values for each service node, based on an aggregation of the water consumption data for all of the water meters that have been automatically associated with the service node;
estimate water flows and pressures for at least a portion of the water distribution system, by running the hydraulic model with the calculated water demand values; and
perform a control operation for the water distribution system, based on the estimated water flows and pressures, said control operation comprising at least one of: leak detection, pumping or storage control, and treatment or flushing control.

13. The computer apparatus of claim 12, wherein the processing circuitry is configured to receive the water consumption data on a near real-time basis via an Automated Meter Reading (AMR) network that communicatively couples to the water meters, and calculate the water demand values in each of a succession of recurring time intervals of one hour or less.

14. The computer apparatus of claim 13, wherein the water consumption data is timestamped and wherein the processing circuitry is configured to estimate the water pressures and flows at multiple times during the day, and record the estimated water pressures and flows in association with corresponding time-of-day information.

15. The computer apparatus of claim 13, wherein the direction of water flow in one or more pipes in the water distribution system depends on prevailing conditions in the water distribution system, and wherein the processing circuitry is configured to determine the direction of water flow in the one or more pipes on at least an hourly basis, and record the determined directions of water flow with corresponding time-of-day information.

16. The computer apparatus of claim 13, wherein the processing circuitry is configured to receive field data having temporal correspondence to the recurring time intervals and comprising recorded flows and pressures, and is configured to revise one or more model parameters based on the recorded flows and pressures and the estimated flows and pressures, the one or more model parameters including a pipe roughness parameter for one or more modeled pipes in the hydraulic model.

17. The computer apparatus of claim 12, wherein the processing circuitry is configured to perform flushing control as said control operation, based at least in part on the estimated flow rates for all or a portion of the water distribution system.

18. The computer apparatus of claim 17, wherein the processing circuitry is configured to perform flushing control by determining a flushing schedule for at least a portion of the water distribution system, in dependence on the estimated flow rates, wherein the flushing schedule identifies times or frequencies for performing flushing at one or more known flush points within the water distribution system.

19. The computer apparatus of claim 12, wherein the processing circuitry is configured to obtain field data for the water distribution system having a temporal correspondence with the water demand data, the field data indicating upstream water quantities flowing towards the water meters associated with one or more of the service nodes in the hydraulic model, and wherein the processing circuitry is configured to perform leak detection as said control operation, based on identifying discrepancies between the indicated upstream water quantities and the water demand values, for one or more of the service nodes, and outputting data identifying involved portions of the water distribution system.

20. The computer apparatus of claim 12, wherein the processing circuitry is configured to evaluate the modeled location and elevation data for the service nodes in relation to the meter location and the meter elevation by determining a Euclidean distance between the water meter and each service node in at least a neighbor set among the plurality of service nodes, ranking at least the neighbor set of service nodes in ascending order of Euclidean distance from the meter location, and identifying the highest-ranked service node whose modeled elevation is greater than the meter elevation.

21. The computer apparatus of claim 12, wherein the processing circuitry is configured to evaluate the modeled location and elevation data for the service nodes in relation to the meter location and the meter elevation by calculating the meter elevation from a geodetic baseline elevation known for the meter location and an elevational offset known from installation data associated with the water meter.

22. The computer apparatus of claim 21, wherein the processing circuitry is configured to receive the installation data from an Automated Meter Reading (AMR) network that is communicatively coupled to the water meter.

* * * * *